Nov. 22, 1966 L. MOLES 3,287,188

METHOD FOR PRODUCING A BORON DIFFUSED SILICON TRANSISTOR

Filed Nov. 1, 1963

INVENTOR.
LESLIE MOLES,
BY John M. Koch
ATTORNEY.

United States Patent Office 3,287,188
Patented Nov. 22, 1966

3,287,188

METHOD FOR PRODUCING A BORON DIFFUSED SILICON TRANSISTOR

Leslie Moles, Newport Beach, Calif., assignor to Hughes Aircraft Company, Culver City, Calif., a corporation of Delaware Filed Nov. 1, 1963, Ser. No. 320,638
1 Claim. (Cl. 148—187)

This invention relates to a method for the production of transistors, and particularly to such a method involving the diffusion of boron into silicon in the mass production of silicon transistors.

In the production of silicon transistors involving the diffusion of boron materials into a silicon substrate at an elevated temperature, the boron containing material generally is transported to the diffusion site by the use of a carrier gas. Boron trichloride generally has been used in industry as the source of boron for diffusion operations. These prior art diffusion operations employing boron trichloride involve the use of complex, all glass systems for the purpose of generating and transporting the boron containing material and carrier gas vapor mixture from the source of generation to the silicon substrate. The all glass boron diffusion system generally employed in industry involves the use of expensive, fragile equipment which is difficult to operate, repair and maintain in operation. Furthermore, the boron trichloride source employed is very corrosive to system components and the disposal of by-products produced after the performance of the diffusion reaction presents a difficult problem. The boron trichloride source material requires regular replenishment and its purity from one batch of material to another is difficult to maintain so that controlled, reproducible results are obtained. Contamination possibilities, under these circumstances, are very great while using this prior art system. In addition, contamination frequently occurs without warning so that considerable amounts of material are processed and wasted before such contamination has been discovered.

Accordingly, it is a principal object of this invention to provide a method for diffusing boron containing material into silicon with good concentration and depth control for the production of silicon transistors.

Another object of this invention is to provide a boron diffusion method for the production of silicon transistors wherein boron trioxide is used as the source material.

A further object of this invention is to simplify the methods generally used for doping silicon transistors with boron trichloride as the doping agent and the development of simple efficient and economical techniques.

A preferred embodiment of the invention is described below with reference to the accompanying drawing, wherein.

Figure 1:
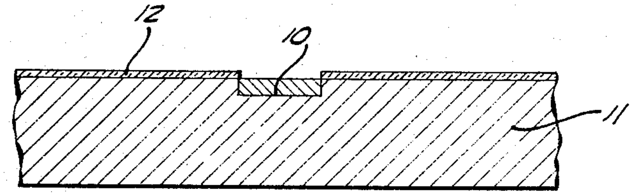
FIG. 1 is a partial vertical sectional view schematically showing a unit portion of a silicon substrate slice having an initial boron diffusion depth formed therein.

The objects of this invention are attained by providing a process for mass producing silicon transistors which comprises the steps of introducing substrate slices of silicon from a single crystal grown ingot into a furnace loading assembly in proximity to a boron trioxide source which also is placed in the loading assembly. The substrate slices of silicon are N type and are doped with phosphorous to produce a resistivity in the range from about 0.25 to about 8.0 ohm centimeter. The loading assembly containing the substrate slices of silicon is inserted into the heated zone of the furnace. The loading assembly is maintained in this heated zone for a predetermined period of time depending upon the diffusion depth desired and the boron concentration desired in the silicon slices, while an inert carrier gas, such as argon, is passed through the furnace. Dry argon carrier gas having a dew point of about −100° F. is used at a flow rate of about 125 cubic centimeters per minutes, for example. For example, the diffusion temperature of the silicon slice is maintained at about 1220° C. for about 14 to 17 minutes to produce an initial diffusion depth indicated at 10 in FIG. 1 of the drawing, showing a vertical sectional view of a silicon substrate slice 11. The initial diffusion depth 10 is about 2.4 microns into silicon slice 11, through an oxide mask 12. A small amount of oxygen is introduced into the carrier gas mixture during the diffusion operation by the use of a small fixed orifice. This introduced oxygen serves to prevent evaporation of silicon from the surfaces of the silicon substrate slices by growing a thin coating of oxide on the exposed surfaces where diffusion takes place.

Figure 2:
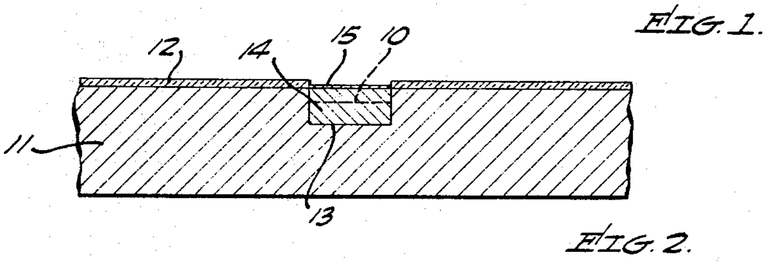
FIG. 2 is a similar view of the silicon substrate slice showing a final boron diffusion depth.

This treatment is followed by a diffusion step involving heat treatment for about one hour at about 1220° C. in a clean atmosphere, i.e., free of boron or doping material. This clean atmosphere is produced by bubbling a stream of oxygen or argon at a rate of about 0.4 cubic foot per hour through de-ionized water maintained at about 90° C. The resulting clean atmosphere is water saturated and reacts with the silicon slices to rapidly produce a silicon dioxide layer 15 over the surface of boron diffused layer 14 at the high prevailing temperature employed. This diffusion step, by virtue of the temperature employed, advances, or drives the initial boron diffusion material to a desired final depth 13 of about 10,000 A, shown in FIG. 2 of the drawing, which is a view similar to that of FIG. 1. The final depth 13 is is about 4.8 microns, producing a layer 14 having a boron concentration of about $3–6 \times 10^{18}$ boron atoms per cubic centimeter.

The concentration of boron atoms in the silicon substrate 11 is controlled by fixing the distance between the boron trioxide doping material and the silicon slices, which in the present example is about five inches. The concentrated gradient from the surface 15 of the boron diffused layer 14 to the diffused junction 13 produced in the manner described above is closely controlled by controlling the distance between the boron trioxide doping material and the silicon slices 11, and by controlling the temperature and time of diffusion employed.

Figure 3:
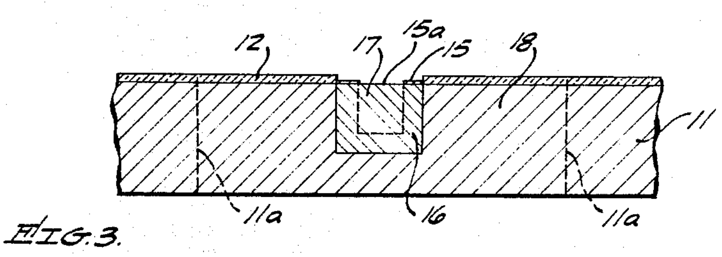
FIG. 3 is a similar view showing the formation of a boron base structure and an emitter structure in the unit of the silicon substrate slice.
Figure 4:
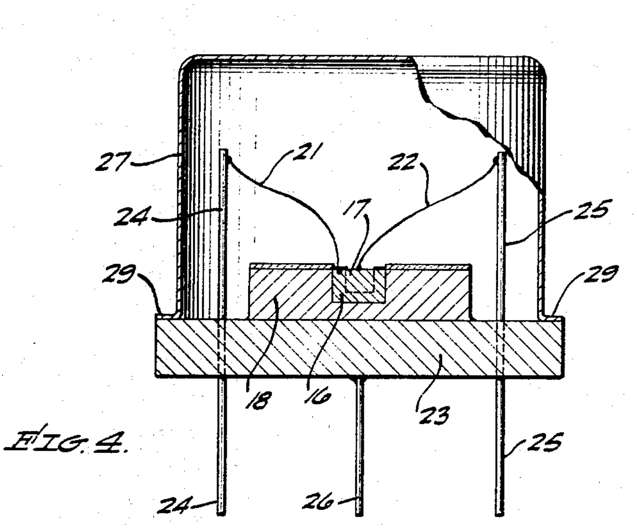
FIG. 4 is a vertical sectional view showing a completed transistor package enclosing a transistor made by the method of the invention.

After the base structures of the transistors are completed as described above, a central portion 15*a* of the oxide layer 15 (FIG. 3), of the base structures is removed by acid etching. Through the resulting opening 15*a*, phosphorus is diffused into the base structures to a depth of about one micron short of the base junction depth 13. This is accomplished by passing a stream of dry argon carrier gas containing phosphorus pentoxide vapor over the silicon slices at elevated temperatures. Transistor structures then result as shown in FIG. 3 where the structure includes a boron base diffusion region 16, a phosphorus emitter diffusion layer 17 and a collector region 18.

Suitable lead attachments 21 and 22 are then made for electrical connections to the base regions and the emitter regions, respectively. The resulting silicon slice then is scribed and broken, as at the dotted vertical lines 11*a*, to provide small transistor structure squares. The bottom surface of each collector region 18 of each structure is fused to a header 23, which serves as the lower portion of a package and provides a collector contact. The base region lead 21 and emitter region lead 22 are welded to header pins 24 and 25, respectively, to provide electrical contact. Pin 26 is welded to header 23 to provide electrical contact to the collector region 18. A header cap 27 is then welded in place, as indicated at 29 to provide a hermetic seal, and complete the transistor package.

Obviously many modifications and variations of the present invention are possible in the light of the above teachings. It is, therefore, to be understood that, within the scope of the appended claim, the invention can be practiced otherwise than as specifically described.

What is claimed is:

A method for producing a boron diffused silicon transistor which comprises the steps of introducing a substrate slice of silicon into a heating zone, introducing a boron trioxide source of doping material into the heating zone a predetermined distance from the silicon substrate slice, heating the silicon substrate slice and the boron trioxide source at a predetermined temperature for a predetermined period of time, removing the boron trioxide source from the heating zone, forming a silicon dioxide diffusion masking layer on the slice, and heating the boron doped silicon substrate slice at a predetermined temperature for a predetermined time to produce the desired depth and concentration of boron doping in the resulting diffused silicon transistor boron diffused base structure.

References Cited by the Examiner

UNITED STATES PATENTS

| | | | |
|---|---|---|---|
| 2,802,760 | 8/1957 | Derick | 29—190 X |
| 2,804,405 | 8/1957 | Derick | 29—190 X |

HYLAND BIZOT, *Primary Examiner.*